US008522675B2

(12) United States Patent
Veltrop

(10) Patent No.: US 8,522,675 B2
(45) Date of Patent: Sep. 3, 2013

(54) HOLDING CABINET FOR SEPARATELY HEATING FOOD TRAYS

(75) Inventor: Loren Veltrop, Chicago, IL (US)

(73) Assignee: Prince Castle, LLC, Carol Stream, IL (US)

( * ) Notice: Subject to any disclaimer, the term of this patent is extended or adjusted under 35 U.S.C. 154(b) by 679 days.

(21) Appl. No.: 12/784,661

(22) Filed: May 21, 2010

(65) Prior Publication Data
US 2011/0283895 A1 Nov. 24, 2011

(51) Int. Cl.
*A47J 39/02* (2006.01)
*A47J 37/00* (2006.01)

(52) U.S. Cl.
USPC .............. 99/448; 99/468; 99/483; 219/214; 219/395; 219/397; 219/407

(58) Field of Classification Search
USPC ............... 99/483, 448, 468, 422; 219/391, 219/411, 412, 414, 492, 486, 494, 506, 214, 219/395, 396, 397, 398, 407, 408, 410, 504
See application file for complete search history.

(56) References Cited

U.S. PATENT DOCUMENTS

| 3,696,720 | A | 10/1972 | Vinson |
| 3,950,632 | A | 4/1976 | Rivelli |
| 3,979,056 | A | 9/1976 | Barnes |
| 4,036,995 | A | 7/1977 | Koether et al. |
| 4,077,690 | A | 3/1978 | Koether |
| 4,237,368 | A * | 12/1980 | Welch ............... 219/448.17 |
| 4,278,872 | A | 7/1981 | Koether et al. |
| 4,388,689 | A | 6/1983 | Hayman et al. |
| 4,530,067 | A | 7/1985 | Dorr |
| 4,569,421 | A | 2/1986 | Sandstedt |
| 4,610,238 | A | 9/1986 | Veth |
| 4,644,931 | A | 2/1987 | Veth |
| 4,688,475 | A | 8/1987 | Witt et al. |
| 4,740,888 | A | 4/1988 | Ceste, Sr. et al. |
| 4,742,455 | A | 5/1988 | Schreyer |
| 4,782,445 | A | 11/1988 | Pasquini |
| 4,812,625 | A | 3/1989 | Ceste, Sr. |
| 4,812,963 | A | 3/1989 | Albrecht et al. |
| 4,864,498 | A | 9/1989 | Pasquini et al. |

(Continued)

FOREIGN PATENT DOCUMENTS

| JP | 8000414 | 1/1996 |
| JP | 10079088 | 3/1998 |

(Continued)

OTHER PUBLICATIONS

Frymaster HCP Installation and Operation Manual, Dec. 2006, pp. 1-1 to 10-4, title page and table of contents; publisher, Enodis, Frymaster LLC, Shreveport, LA.

(Continued)

*Primary Examiner* — Reginald L Alexander
(74) *Attorney, Agent, or Firm* — Joseph P. Krause

(57) ABSTRACT

A food holding cabinet having one or more food-holding compartments has two or more zones in a compartment, wherein holding temperatures can be different from each other. A shelf made of glass-ceramic passes infrared energy from two or more heating elements attached to the glass-ceramic shelf. Energy emitted from the different heating elements effectuate different temperatures of localized regions of the glass-ceramic and impart different amounts of heat energy into a food item or food holding trays above the heating elements.

22 Claims, 6 Drawing Sheets

(56) References Cited

U.S. PATENT DOCUMENTS

| | | |
|---|---|---|
| 4,911,068 A | 3/1990 | Koether et al. |
| 4,922,435 A | 5/1990 | Cahlander et al. |
| 5,003,472 A | 3/1991 | Perrill et al. |
| 5,069,273 A | 12/1991 | O'Hearne |
| 5,093,556 A | 3/1992 | Oelfke |
| 5,128,862 A | 7/1992 | Mueller |
| 5,132,914 A | 7/1992 | Cahlander et al. |
| 5,172,328 A | 12/1992 | Cahlander et al. |
| 5,188,020 A | 2/1993 | Buchnag |
| 5,216,918 A | 6/1993 | Landis et al. |
| 5,218,527 A | 6/1993 | Ishikawa et al. |
| 5,253,564 A | 10/1993 | Rosenbrock et al. |
| 5,357,426 A | 10/1994 | Morita et al. |
| D364,530 S | 11/1995 | Robards, Jr. et al. |
| 5,485,780 A | 1/1996 | Koether et al. |
| 5,504,589 A | 4/1996 | Montague et al. |
| 5,510,979 A | 4/1996 | Moderi et al. |
| 5,539,671 A | 7/1996 | Albrecht et al. |
| 5,553,312 A | 9/1996 | Gattey et al. |
| 5,579,952 A | 12/1996 | Fiedler et al. |
| 5,590,586 A | 1/1997 | Ulfig et al. |
| 5,594,222 A | 1/1997 | Caldwell |
| 5,616,269 A | 4/1997 | Fowler et al. |
| 5,653,906 A | 8/1997 | Fowler et al. |
| 5,724,886 A | 3/1998 | Ewald et al. |
| 5,772,072 A | 6/1998 | Prescott |
| 5,812,393 A | 9/1998 | Drucker |
| 5,900,173 A | 5/1999 | Robards, Jr. |
| 5,931,083 A | 8/1999 | Stanger et al. |
| 5,939,974 A | 8/1999 | Heagle et al. |
| 5,947,012 A | 9/1999 | Ewald et al. |
| 6,000,622 A | 12/1999 | Tonner et al. |
| 6,011,243 A | 1/2000 | Arnold et al. |
| 6,026,372 A | 2/2000 | Savage |
| 6,031,208 A | 2/2000 | Witt et al. |
| 6,052,667 A | 4/2000 | Walker et al. |
| D427,008 S | 6/2000 | Wasner |
| D427,479 S | 7/2000 | Wasner |
| 6,088,681 A | 7/2000 | Coleman et al. |
| 6,114,659 A | 9/2000 | Finck et al. |
| 6,116,154 A | 9/2000 | Vaseloff |
| 6,119,587 A | 9/2000 | Ewald et al. |
| 6,153,244 A | 11/2000 | Stanger et al. |
| 6,158,885 A | 12/2000 | Landis |
| 6,175,099 B1 | 1/2001 | Shei et al. |
| 6,200,944 B1 | 3/2001 | Dovey et al. |
| 6,209,447 B1 * | 4/2001 | Ewald et al. ............ 99/483 |
| 6,257,010 B1 | 7/2001 | Shei et al. |
| 6,261,621 B1 | 7/2001 | Stanger et al. |
| 6,262,394 B1 | 7/2001 | Shei et al. |
| 6,412,403 B1 | 7/2002 | Veltrop |
| 6,541,739 B2 | 4/2003 | Shei et al. |
| 6,637,322 B2 | 10/2003 | Veltrop |
| 6,658,994 B1 * | 12/2003 | McMillan ............ 99/468 |
| 6,825,447 B2 | 11/2004 | Kim et al. |
| 6,834,276 B2 | 12/2004 | Jensen et al. |
| 6,878,391 B2 | 4/2005 | Veltrop |
| 6,884,451 B2 | 4/2005 | Veltrop |
| 7,105,779 B2 | 9/2006 | Shei |
| 7,132,926 B2 | 11/2006 | Vaseloff et al. |
| 7,227,102 B2 | 6/2007 | Shei |
| 7,235,762 B2 | 6/2007 | Gagas et al. |
| 7,258,064 B2 | 8/2007 | Vaseloff et al. |
| 7,279,659 B2 | 10/2007 | Gagas et al. |
| 7,328,654 B2 | 2/2008 | Shei |
| RE40,151 E | 3/2008 | Shei et al. |
| RE40,290 E | 5/2008 | Shei et al. |
| 7,376,485 B2 | 5/2008 | Salerno |
| D570,715 S | 6/2008 | Di Federico |
| 7,381,927 B1 | 6/2008 | Agnello |
| 7,446,282 B2 | 11/2008 | Shei et al. |
| 7,628,107 B2 | 12/2009 | Vaseloff et al. |
| 7,905,173 B2 * | 3/2011 | Sus et al. ............ 99/483 |
| 2007/0144202 A1 | 6/2007 | Theodos et al. |
| 2007/0251397 A1 | 11/2007 | Dorsten et al. |
| 2008/0302779 A1 * | 12/2008 | Bally et al. ............ 219/396 |
| 2009/0045185 A1 | 2/2009 | Schroeder et al. |
| 2011/0083564 A1 * | 4/2011 | Kirby et al. ............ 99/468 |

FOREIGN PATENT DOCUMENTS

| | | |
|---|---|---|
| JP | 11342061 | 12/1999 |
| WO | 0131533 | 5/2001 |
| WO | 20051034633 | 4/2004 |
| WO | 2005034633 | 4/2005 |

OTHER PUBLICATIONS

Prince Castle LLC, Holding Panels (www.princecastle.com).
Prince Castle LLC, Holding Bins (www.princecastle.com).
Thermodyne Food Products, Inc., Counter Top Holding Oven Model 300 NDNL specification.

* cited by examiner

US 8,522,675 B2

HOLDING CABINET FOR SEPARATELY HEATING FOOD TRAYS

BACKGROUND

Many restaurants' success depends on how quickly customers can be served with food items that a customer orders and on the quality of the food when it is served. If the rate at which a restaurant prepares food products equals the rate at which those same food products are ordered and sold, a restaurant can theoretically have freshly-prepared foods ready to serve for customers as they arrive. It is not always possible to match food production with customer ordering rates however. Since many restaurant customers expect to receive their ordered food items quickly, many restaurants prepare food items ahead of actual orders and keep them ready for sale.

Prior art food holding ovens or cabinets that keep food warm until it is served are well known. Such cabinets have one or more horizontal compartments in which a packaged food item or food holding tray is kept at an elevated temperature within a relatively narrow temperature range. The compartments of many prior art food holding cabinets are defined by flat, metal shelves. The shelves are typically heated by an electrically-resistive wire attached to the bottom or underside of the metal shelf.

Those of ordinary skill in the restaurant industry know that different types of foods are often best kept at different holding temperatures. A problem with prior art food holding cabinets that have food holding compartments defined by metal shelves is that the metal shelves eventually reach a single, uniform temperature. Keeping different foods at different holding temperatures thus requires using different compartments that are held at different temperatures or in different cabinets. A food holding cabinet that has one or more compartments in which food products can be kept at different holding temperatures in the same compartment(s) would be an improvement over the prior art.

DETAIL DESCRIPTION

Figure 1:
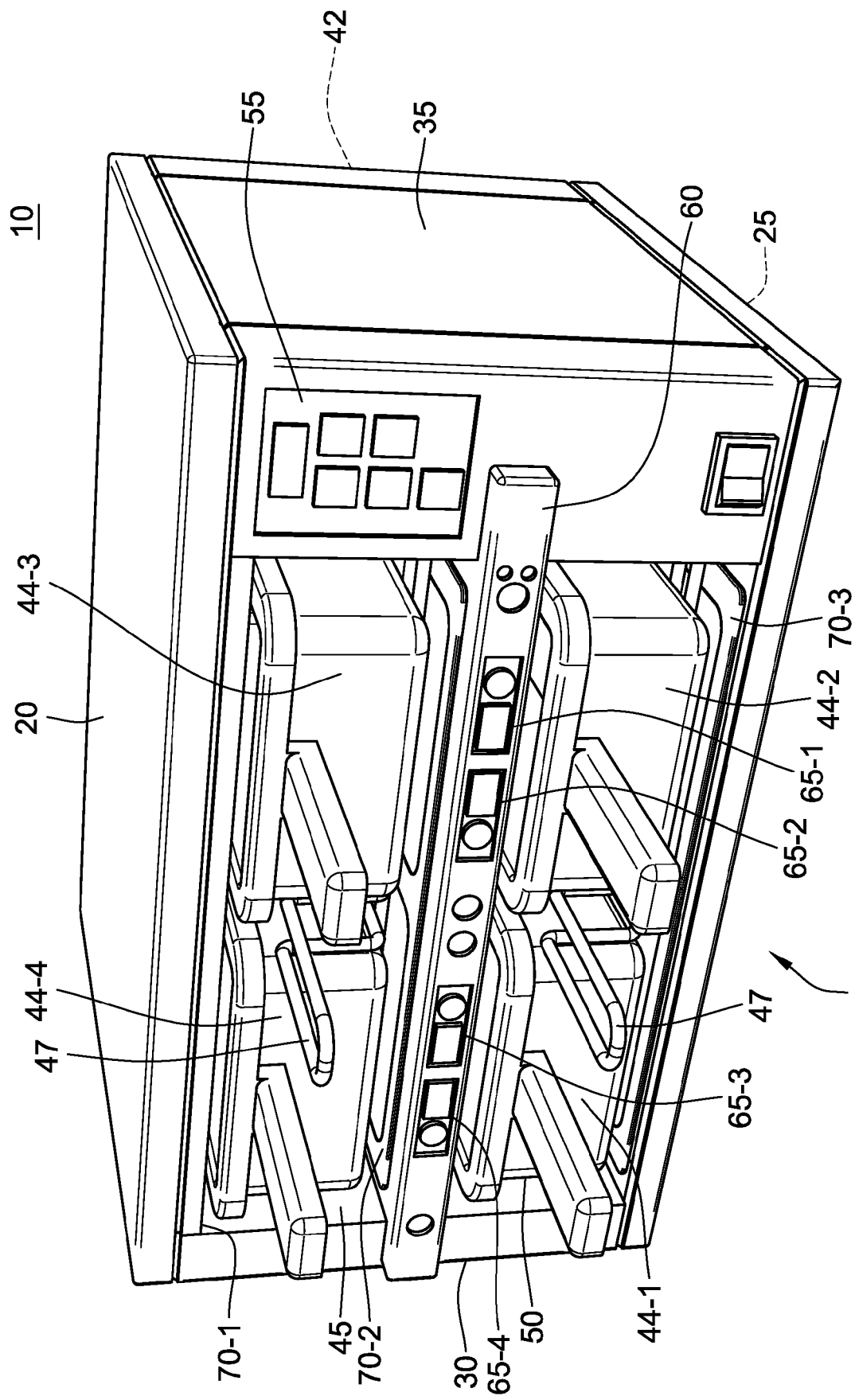
FIG. 1 is a perspective view of a food holding cabinet.

FIG. 1 is a perspective view of a food holding cabinet 10, which is comprised of IR-transmissive glass-ceramic panels for the shelves and/or top and bottom panels. In the preferred embodiment, infrared energy from independently-controlled heating elements is transmitted through shelves and/or panels made of glass-ceramic, to foods and/or food holding trays. The glass-ceramic facilitates selective heating of different sections of the same compartment, i.e., the selective heating of foods and/or food holding trays therein.

Ordinary glass and glass-ceramic are both non-metallic and electrically non-conductive but they also have some distinctly different physical properties. The amorphous structure of ordinary glass makes it brittle. Glass-ceramic on the other hand is relatively strong and resistant to impact. Because ordinary glass does not contain planes of atoms that can slip past each other, there is no way to relieve the stress from mechanical or thermal means in an ordinary glass, however, a controlled introduction of small crystals within amorphous glass prevents cracks from propagating through the glass. The resulting material is a glass-ceramic.

Overheating ordinary glass causes a portion of the structure to be transformed into a fine-grained crystalline structure. Glass-ceramics with 60% to 80% crystalline structure exhibit a close-to-zero thermal expansion coefficient (CTE), which, of course, is highly desirable for many heating applications. Glass-ceramic is also known as an ultra-low thermal expansion glass.

In addition to being a mechanically strong material, glass-ceramic can sustain repeated and quick temperature changes over wide temperature ranges. While glass-ceramic has a relatively low heat conduction coefficient, it can be made nearly transparent to infrared energy, e.g., 15-20% loss in a typical glass-ceramic cook top, the lost IR being absorbed by the glass-ceramic, causing its temperature to rise.

Import ingredients of zero or near-zero CTE glass-ceramic are oxides of lithium, silicon, and aluminum. Glass-ceramic also has refining agents comprised of oxides of sodium, potassium, and calcium. Glass-ceramics also usually contain nucleation agents of zirconium and titanium oxides.

Glass-ceramic is devoid (or essentially devoid) of pores which makes it relatively easy to clean. Because of its various physical and thermal characteristics, it is frequently used for range cook tops. It is sold under various trade names and trademarks, two of which include CERAN® sold by Schott North America, Inc., 555 Taxter Road, Elmsford, N.Y. 10523 and MACOR™, sold by Corning, Incorporated.

Referring now to FIG. 1, the cabinet 10 is comprised of a chassis, which is itself comprised of a top panel 20, a bottom panel 25, a left side panel 30, a right side panel 35, an open front face 40 through which food products and food holding trays can be passed, and an open rear face 42, not visible in FIG. 1.

The cabinet has two, vertically-separated compartments, i.e., an upper compartment 45 and a lower compartment 50. Food holding trays 44 inside the compartments 45 and 50 are kept warm, i.e., between about 150 degrees Fahrenheit and about 400 degrees Fahrenheit by the absorption of IR emitted from electrically-controlled heaters located behind glass-ceramic panels above and below the trays 44. Different food holding trays 44 in the same, open, horizontal food holding compartments 45 and/or 50, can be maintained at significantly different temperatures simply by directing different amounts of infrared energy into them from corresponding separately and individually controlled heating elements mounted to glass-ceramic panels that define the compartments.

By way of example, in FIG. 1, the tray 44-4 on the left-hand side of the top compartment 45, can be irradiated with infrared energy from heating elements located directly above and/or directly below the tray 44-4 with an intensity (or energy density in watts per unit area) such that the tray 44-4 and/or its contents will be kept at or near a first temperature within a first temperature range at the same time that an adjacent food holding tray 44-3 on the right-hand side of the same, top compartment 45 is kept at a different, second temperature, within a second and different temperature range by the IR emitted from different heating elements located directly above and/or directly below the adjacent, second tray 44-3. Similarly, the first and second trays 44-1 and 44-2 in the lower compartment 50 can also be kept at or near third and fourth different temperatures, in the same or different temperature ranges, which can be the same or different from the first and second temperatures in the first and second ranges. Alternatively, all the trays can be irradiated with infrared of the same intensity and kept at or near the same temperature in the same range.

The upper compartment 45 and lower compartment 50 are separated from each other by a "shelf" 70-2, which is itself constructed to emit IR into the adjacent compartments 45 and 50. The structure of the shelf 70-2 that enables it to emit IR, is hidden behind a panel or bezel identified by reference numeral 60.

Figure 2:
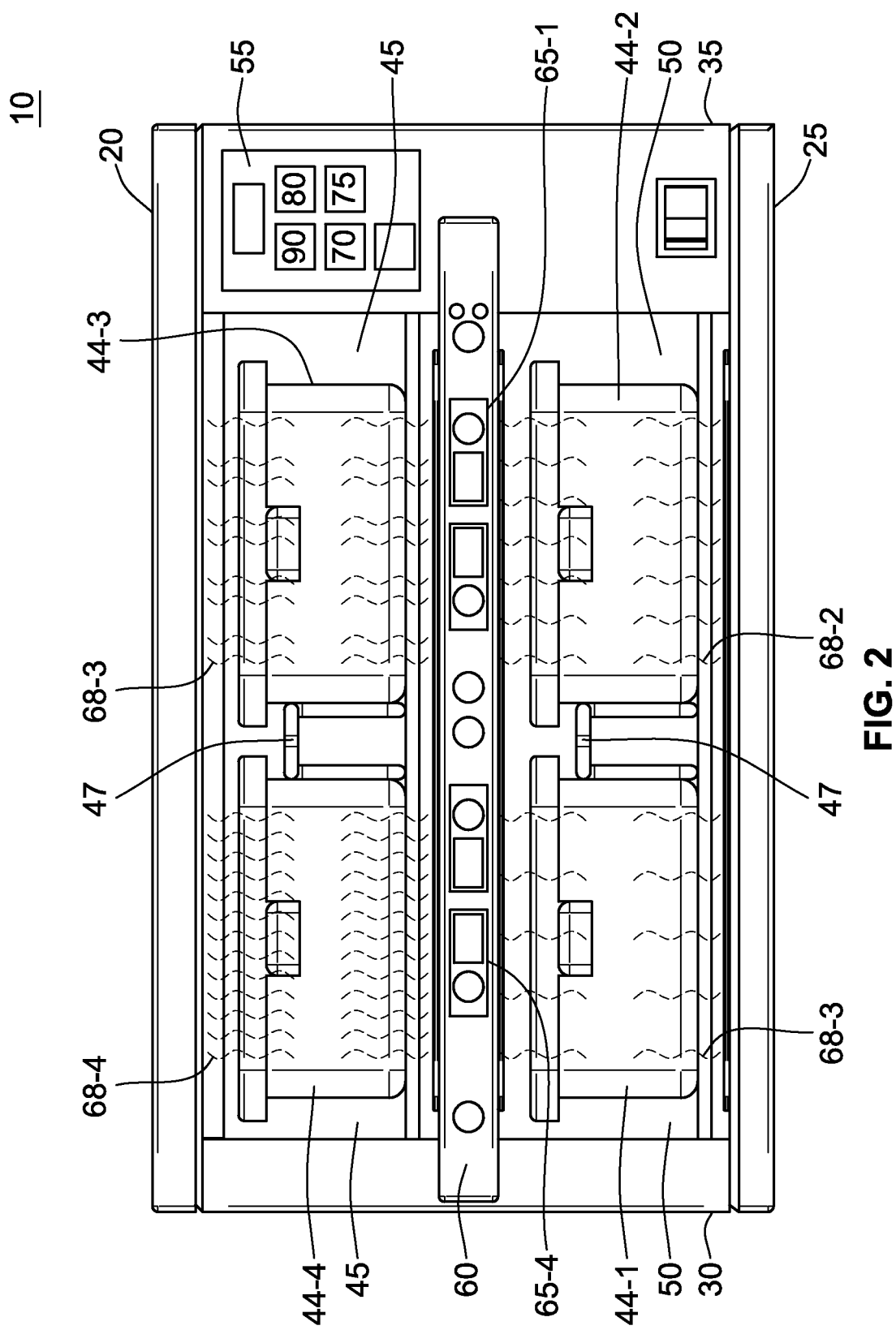
FIG. 2 is a front elevation view of the cabinet shown in FIG. 1.

The bezel 60 shown in FIG. 1 and FIG. 2 is configured to support four information-bearing compartment displays 65-1, 65-2, 65-3, and 65-4. Each compartment display 65-1 through 65-4 includes a liquid crystal display panel or a light-emitting diode array to display information for a corresponding portion or side of a compartment 45 or 50, which is separately and independently irradiated by corresponding heating elements operatively coupled to corresponding portions of the shelf and panels that are located above or below the corresponding portions of the compartments. By way of example, the compartment display identified by reference numeral 65-1 provides information about the right-hand side of the lower compartment 50 and the food holding tray 44-2 held therein. The compartment display 65-2 provides information about the right-hand side of the upper compartment 45 and the food holding tray 44-3 held therein.

The cabinet 10 and its functionality including information displayed on the displays 65, is controlled by a master computer. Such a computer is disclosed in the Applicant's co-pending patent application identified by application Ser. No. 12/618,957, filed on Nov. 16, 2009, and entitled, Food Holding Cabinet Power Supplies with Downloadable Software. That application discloses among other things, a master controller for a food holding cabinet and is incorporated herein by reference in its entirety. A front panel for the master controller is identified by reference numeral 55.

FIG. 2 is a front elevation of the food holding cabinet 10 shown in FIG. 1. In this figure, four separate sets of broken serpentine lines identified be reference numerals 68-1 through 68-4, represent different amounts of heat energy being transmitted into corresponding food holding trays 44. As can be seen in the figure, IR is emitted into the trays 44 from above and below each tray. In an alternate embodiment, however, IR can be transmitted into the trays from a single direction.

The horizontal spacing between individual serpentine lines in the different sets 68-1 through 68-4 is different, simply to depict different density and intensity levels for IR directed toward each tray 44. The serpentine lines 68-1 above and below the food holding tray 44-1 are horizontally spaced apart from each other more than the serpentine lines 68-2, 68-3, 68-4. Conversely, the serpentine lines 68-4 above and below the food holding tray 44-4 in the upper left hand corner are the most closely spaced serpentine lines depicted in FIG. 2.

The preferred embodiment of the cabinet 10 has IR-transmissive glass-ceramic panels 100 and associated heating elements 85 at both the top and bottom of each compartment 45 and 50. Food holding trays 44 in the compartments 45 and 50 are thus depicted in FIG. 2 as being irradiated by infrared energy from both above and below the trays 44. Alternate cabinet embodiments include irradiating the trays 44 and/or food from a single direction.

Figure 3:
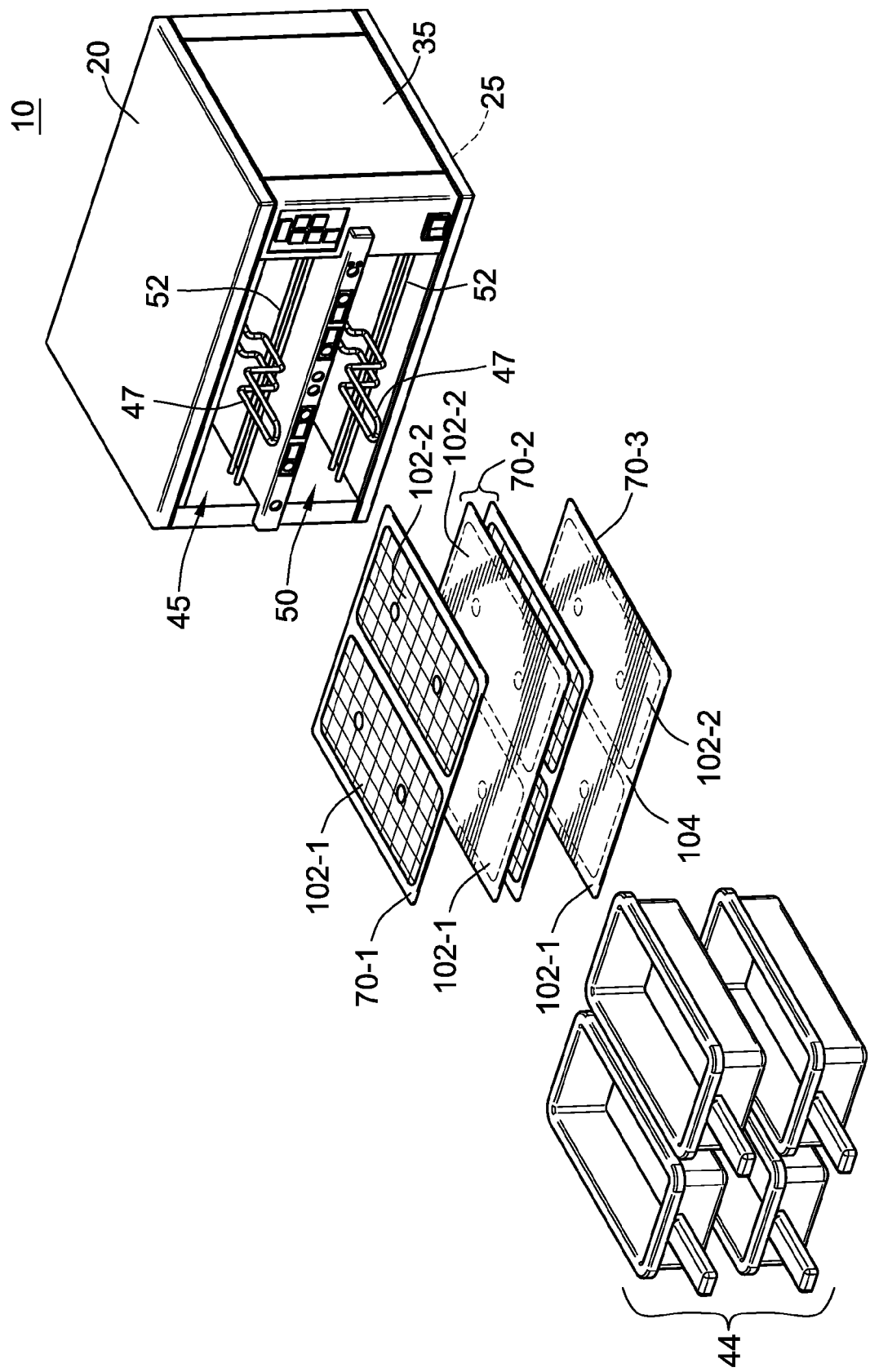
FIG. 3 is an exploded view of the cabinet shown in FIG. 1 and FIG. 2.

FIG. 3 is an exploded view of the oven 10 shown in FIG. 1 and FIG. 2. The two vertically-separated compartments 45 and 50 are effectively divided into left and right sides or halves by a compartment separator 47 made of a heavy-gauge wire or metal rod. The compartment separator 47 thus allows a food holding tray 44 to be inserted into either the left side or right side of the separator 47 where it will be directly under and above heating elements 85. Metallic horizontal bars 52 are located above an intermediate or "middle" shelf assembly 70-2 keep the trays 44 supported above and out of direct contact with the middle shelf assembly 70-2.

As shown in the figures, the compartment separator 47 divides the compartments 45 and 50 into substantially equal-width sides or portions. Alternate embodiments locate the compartment separator such that one "side" of a compartment is wider than the other.

In FIG. 3 and FIG. 4, an upper, heating plate assembly 70-1 is located "above" or at (or near) the top of the upper compartment 45. It radiates heat energy downwardly, in a single direction, as indicated by the serpentine lines 68-3 and 68-4 shown in FIG. 2.

A middle shelf/heating plate assembly 70-2 is located between the two compartments 45 and 50. It essentially defines the two, vertically-separated heating compartments 45 and 50. As shown in FIG. 2, the middle shelf assembly 70-2 is configured to emit heat into both the upper compartment 45 and the lower compartment 50. Infrared heat energy is upwardly into the top compartment 45 and downwardly into the bottom compartment 50.

The middle shelf assembly 70-2 is preferably positioned approximately midway between the top and bottom panels 20 and 25 of the cabinet 10 such that the two compartments 45 and 50 have essentially the same height. The two compartments 45 and 50 are thus able to accommodate the same trays 44 or food items. The middle shelf assembly 70-2 can also be located above or below the midway point (between the upper and lower panels 20 and 25) so that one of the compartments 45 or 50 has a height greater than the other. Such an alternate embodiment can accommodate taller trays or larger food items in one compartment and shorter trays or smaller food items in the other.

Still referring to FIG. 3 and FIG. 4, a lower heating plate assembly 70-3 is located at (or near) the bottom of the lower compartment 50. Similar to the upper heating plate assembly 70-1, the lower heating plate assembly 70-3 is configured to emit heat energy in a single direction, which in the case of the lower heating plate assembly 70-3 is upwardly, into the lower compartment 50, as shown in FIG. 2.

Figure 4A:
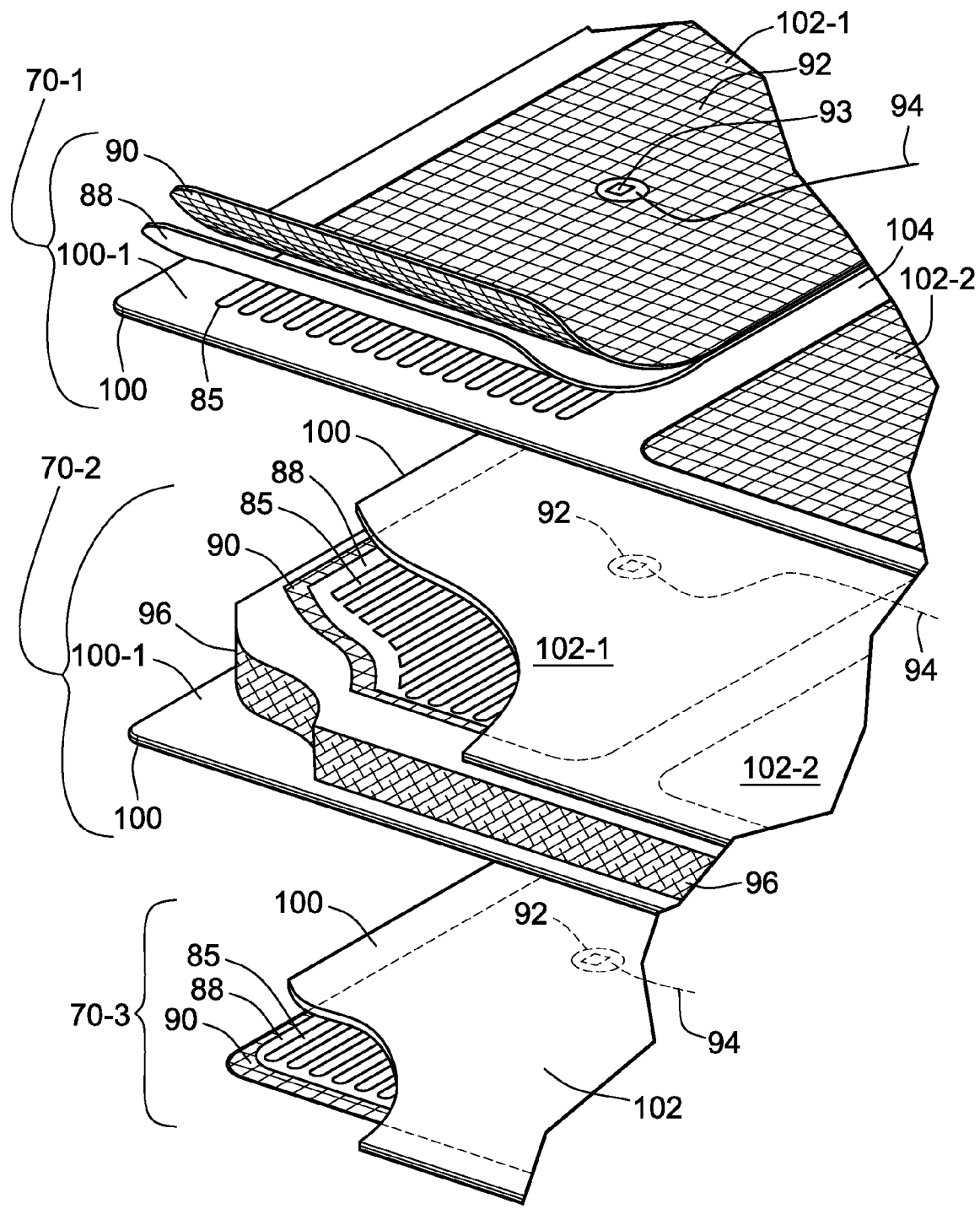
FIG. 4A depicts the top, middle, and bottom shelves of the cabinet shown in FIG. 1 and FIG. 2.

FIG. 4A is a perspective view of the three heating plate assemblies 70-1, 70-2, and 70-3 shown in greater detail. The upper and lower heating plate assemblies 70-1 and 70-3 respectively are each comprised of a single, planar or substantially planar panel 100 made of glass-ceramic. As used hereinafter, the term "panel" is used interchangeably hereinafter with the term "plate."

Electrically-resistive heater wires 85 are mechanically attached to the away-side 100-1 of the glass-ceramic plates 100 by a vulcanization layer 90. The vulcanization layer, which is bonded to the glass-ceramic panel 100 by heating it, holds the heater wire 85 in place. The heater wire 85 is thus mechanically attached to the side 100-1 of the plate 100 that faces away from a compartment (45 and/or 50) to be heated. The heater wire 85 is also thermally coupled to the glass-ceramic plate 100.

An optional, infrared-reflective layer 88 comprised of a polished sheet or foil of aluminum can be added between the heater wire 85 and the vulcanization layer 90 and held in place by the vulcanization layer 90. An IR-reflective layer directs at least some of the IR emitted toward the vulcanization layer 90 back toward a compartment 45 or 50 being irradiated by IR.

Heating plate assemblies 70-1, 70-2 and 70-3 can be made using glass-ceramic that blocks ultraviolet. In another embodiment a separate ultraviolet (UV) filter layer can be added to the assemblies to suppress UV that might be generated by the heater elements 85. A separate UV filter layer is preferably located between the heater wire 85 and the glass-ceramic panel 100 to help prevent or eliminate the transmission of potentially-harmful UV energy into the compartment and/or the area surrounding the cabinet 10. Such a filter is not shown in the figures of this application but is depicted as element 128 in FIG. 4 of the Applicant's co-pending patent application Ser. No. 11/850,071, entitled, FOOD HOLDING OVEN AND TRAY WITH INFRARED HEAT WEIGHTED AROUND THE TRAY PERIPHERY. The co-pending '071 patent application was filed on Sep. 5, 2007. It depicts an IR-emitting heating element in combination with a UV filter layer 128 that suppresses the transmission of ultraviolet energy generated by the IR-emitting heating element. The contents of the '071 patent application are incorporated herein by reference.

As shown in FIG. 4A, the top heating assembly or "shelf" 70-1 is comprised of a first layer of glass-ceramic 100. Two electrically-resistive heating elements 85, which are physically spaced apart from each other and electrically isolated from each other, are attached to the top surface 100-1 of the glass-ceramic plate 100 by corresponding vulcanization layers 90. The top surface 100-1 is the surface of the plate 100 that is considered herein to be "away" from the compartment 45 to be irradiated by IR emitted from the heater wire 85. One wire 85 is shown in the figure as being under a partially-removed vulcanization layer 90. The other wire 85 is not shown in FIG. 4A because it is depicted as being underneath the laterally-adjacent vulcanization layer 90 that is shown as being on the right-hand side of the upper plate 70-1.

Some IR will of course be emitted from the heating element 85 in direction that are away from the compartment, i.e., toward the vulcanization layer 90. Some of that backwardly-emitted and "lost" IR can be recovered and re-directed toward the glass-ceramic plate 100 and toward a compartment by adding the aforementioned optional, infrared-reflective layer 88, which is preferably made of a polished, IR-reflective aluminum sheet or foil. The IR-reflective layer 88 is shown in FIG. 4A located between the heating element 85 and the vulcanization layer 90.

As mentioned above, the two heating elements 85 attached to the away side or top surface 100-1 of the glass-ceramic panel 100, are electrically separated from each other. Electric current from a power supply, which flows through one heater wire 85 does not also pass through the other heater wire 85.

The heater wires 85 are also physically or spatially and thermally spaced apart from each other with the separation distance between the two wires considered to be a thermal break 104. In FIG. 3 and FIG. 4, the thermal break 104 is an area or strip 104 of the glass-ceramic plate 100 where there is no heating element attached and therefore no external heat is applied.

The area of the glass-ceramic panel 100 that receives a heater wire 85, and the electrical and physical separation of the heating wires 85 from each other effectively define spatially and thermally separated heating areas. These heating areas are identified in the figures by reference numerals 102-1 and 102-2 and generally match with, or correspond to the size and shape of the vulcanization layers 90 due to the fact that in FIG. 4, the vulcanization layers 90 and the heater elements 85 are substantially co-extensive, i.e., substantially the same size and shape. The size and shape of a heating area is not defined by the vulcanization layers 90 but is essentially defined by the size and shape of a heating elements 85 and the area on the away-side 100-1 of a glass-ceramic plate 100 that a heating element covers.

In the embodiment shown, the heating elements 85 for the heating areas 102-1 and 102-2 are held in place by two different vulcanization layers 90. In an alternate embodiment, a single vulcanization layer can be used to hold both heating elements 85 in place against one of the two planar and opposing sides of the glass-ceramic plates or panels that are identified by reference numeral 100. A single vulcanization layer 90 overlaid the two electrically isolated and spatially separated heater wires as shown in the figures nevertheless effectuates two separate heating areas.

In the preferred embodiment, the electrical characteristics of the wires 85 are similar and preferably identical to each other. If the amount of wire attached to the plate 100 per unit area is also similar or identical for each heating area 102, the amount of infrared energy emitted from the two electrically and physically-separated heating element wires 85 in the corresponding heating areas 102-1 and 102-2, (watts per unit area) will differ based on the amount of electric current flowing through the different wires 85. Controlling the heat energy input to a particular tray 44 located in a particular compartment 45 or 50, and on one side of a compartment separator 47 or the other, can thus be controlled by controlling the current provided to the heater elements 85 above and/or below the tray 44. Temperatures of trays 44 (and/or food items therein), which are irradiated by different heater elements 85 located above and below them in different heating areas 102-1 and 102-2, tend to stay different, relative to each other because glass-ceramic is a relatively poor thermal conductor and since the heating areas 102-1 and 102-2 are physically separated from each other by an unheated thermal break area 104, The compartment-defining middle shelf 70-2 is similar to the upper and lower plates 70-1 and 70-2 in that electrically and physically-separated, IR-emitting heating elements 85 are attached to one side of two separate glass-ceramic plates 100 that are separated from each other. IR energy is emitted through the glass-ceramic plates 100 and into an adjacent compartment 45 and/or 50. Unlike the upper and lower heating plate assemblies 70-1 and 70-3, which emit IR in a single direction, the compartment-defining middle heating plate assembly/shelf 70-2, is configured to be capable of emitting infrared heat energy in both directions, i.e., into a compartment 45 above the shelf 70-2 and a compartment 50 immediately below the shelf, as shown in FIG. 3.

The middle, compartment-defining shelf 70-2 is essentially comprised of two of the heating plate assemblies/shelves 70-1 or 70-3, which direct IR in opposite directions, i.e., they point away from each other. Two such heating plate assemblies 70-1 or 70-3, are directed away from each other but separated from each by a thermal insulation layer 96. As with the upper and lower heating plate assemblies 70-1 and 70-3, IR-reflective layers 88 can be added between the insulation layer 96 and the heating elements 85 to re-direct at least some of the IR emitted toward the insulation layer 96 back toward the glass-ceramic layers. UV filters can also be added.

The lower shelf 70-3 is also comprised of a plate or panel 100 of glass-ceramic. The lower or underside surface of the panel 100 is not visible in 4A but it has an electrically-resistive heater wire 85 attached to it by a vulcanization layer 90. An IR reflective layer between the vulcanization layer 90 and the heater element 85 helps to recover and redirect toward the lower compartment 50, IR that would otherwise be lost.

Figure 4B:
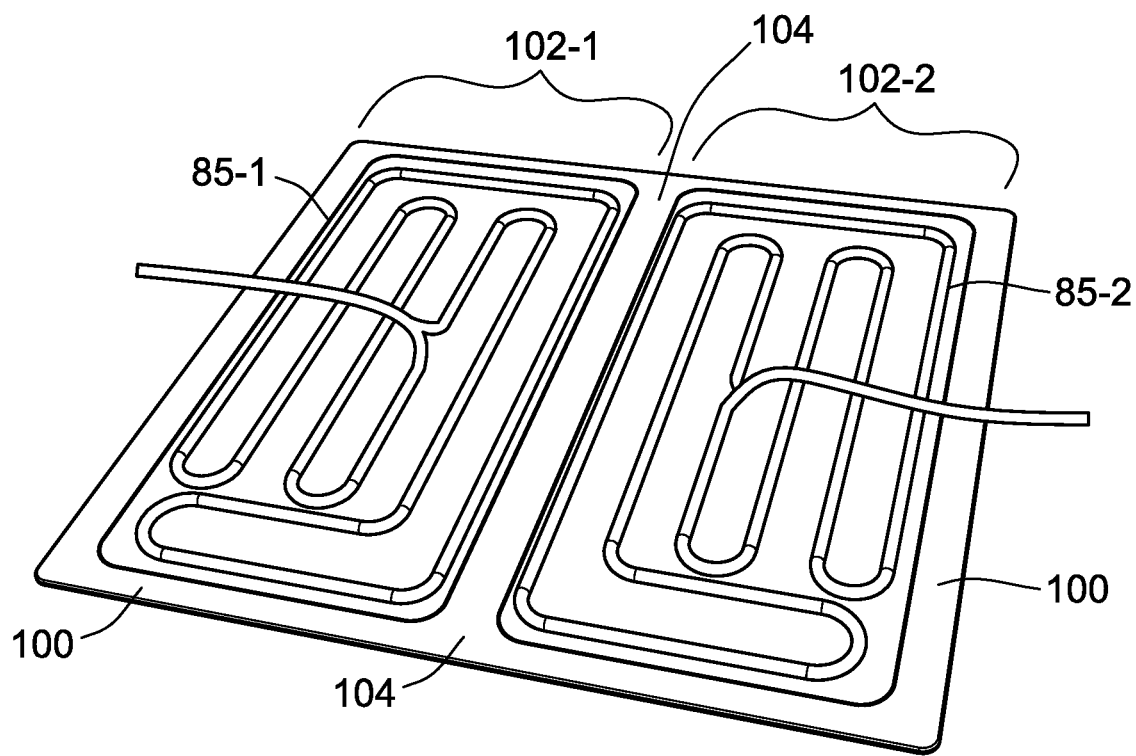
FIG. 4B shows the underside or "backside" of one shelf formed of a glass-ceramic and having two separately heated regions separated from each other by a thermal break region.

FIG. 4B is perspective view of the rear side of one of the glass-ceramic panels 100, but with the vulcanization layer 90 removed to show two, side-by-side heating elements 85, which are arranged in boustrophedonic loops. The heating elements 85 are mechanically and thermally coupled to the away side 100-1 of the glass-ceramic shelf panel 100 by the aforementioned vulcanization layer. The left-hand heating element 85-1 and the right-hand side heating element 85-2 are laterally separated from each other by an intermediate unheated area 104 considered to be a thermal break area.

No externally-supplied heat energy is provided to the thermal break area 104. The thermal break area 104 along with the heat transfer characteristics of the glass-ceramic shelf material effectively define spatially-separated first and second heated regions 102 on the left and right-hand sides of the panel 100 respectively. The left side is identified by reference numeral 102-1; the right side is identified by reference numeral 102-2.

As mentioned above, glass-ceramic is not completely transparent to infrared red; some heating of the glass-ceramic material in the heated areas 102-1 and 102-2 will occur due to IR absorption by the glass-ceramic. The "heated areas" 102-1 and 102-2 of a glass-ceramic panel 100 not only pass infrared from a heater element 85 into a compartment but are in fact heated and will attain elevated temperatures proportional to the IR absorbed by the glass-ceramic material. As the temperature of the heated areas 102-1 and 102-2 rises, heat energy from them can be transferred by conduction into a body in thermal contact with them.

The heat-conductive and IR-transmissive characteristics of the glass-ceramic material from which the heating plate assemblies/shelves 70-1, 70-2 and 70-3 are made, and the physical and electrical separation of separate heating coils 85 nevertheless imbue the shelves and panels with the ability to maintain one area of a shelf at a first temperature and a second area, spaced apart from the first area at a second and different temperature by controlling the amount of power provided to corresponding heating elements 85. Stated another way, by using a glass-ceramic for a compartment-defining shelf and/or a compartment-defining top or bottom panel, and using electrically and physically-separate heating coils coupled to the glass-ceramic panel, or by using infrared-emitting lamps for example, it is possible to maintain different foods and/or different heating trays 44 in the same horizontal compartment 45 and/or 50, at different holding temperatures.

Alternate cabinet embodiments include a chassis having a single compartment as well as more than two compartments. Compartments can also have more than two, separately heated areas.

Figure 6:
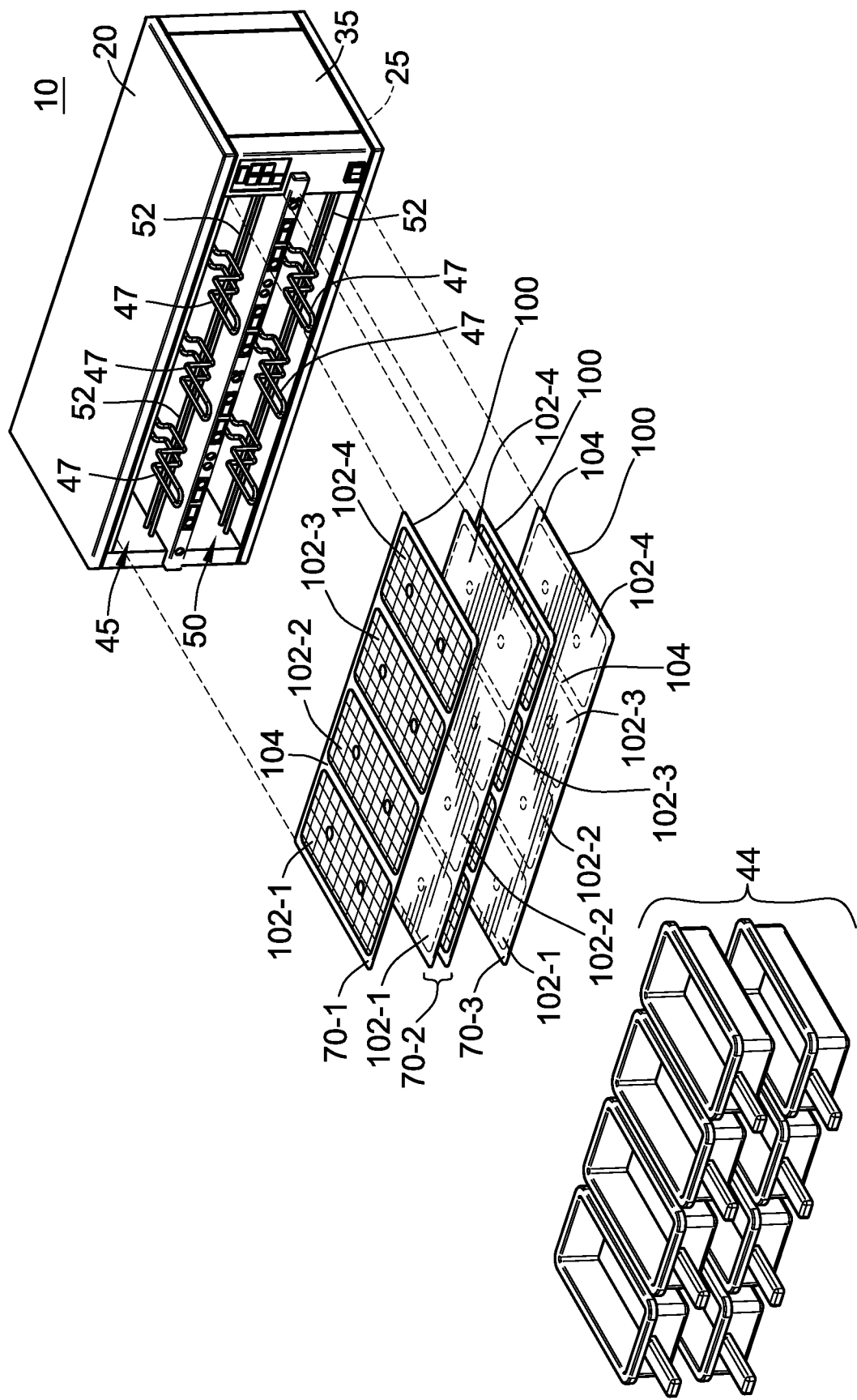
FIG. 6 is a perspective view of an alternate embodiment of the food holding cabinet.

FIG. 6 shows an alternate embodiment of a holding cabinet for separately heating food and/or food holding trays. The cabinet shown in FIG. 6 has two horizontal compartments 45 and 50, both of which are widened and provided with wider glass-ceramic panels. Three compartment separators 47 in each compartment 45 and 50, define four separate bays or heating areas 102-1-102-4 in each compartment 45 and 50.

As with the cabinet shown in FIGS. 1-5, the heat energy input to corresponding heating elements for the four separate heating areas 102-1 through 102-4, can be individually controlled. Each heating area can thereby be provided with the same or different amounts of heat energy, as restaurant demands require.

Those of ordinary skill in the art will recognize that the cabinets shown in FIG. 1 and FIG. 6 can have an open front face and an open rear face. An alternate embodiment however includes cabinets having a closed rear face. Foods and/or food trays can only be put into such a cabinet 10 from the front face.

Alternate cabinet embodiments include the use of materials that might not be considered by some as a glass-ceramic. Such materials include IR-transmissive materials that have an ultra-low thermal expansion coefficient and which are relatively poor conductors of thermal energy such as a heat-resistant glass.

For purposes of clarity, the upper and lower heating plate assemblies or "plates" that are identified by reference numerals 70-1, 70-2 and 70-3 are considered to be encompassed by the term "shelf" in that each of them is capable of functioning as a shelf. The upper and lower heating plate assemblies 70-1 and 70-3 emit IR heat energy into only one compartment. The plates 70-1 and 70-3 and the shelf are considered as being fixed in the chassis between the upper and lower panels.

The heating areas 102-1 and 102-2 are depicted in FIGS. 3, 4A and 4B as having the same size and rectangular shape. Alternate embodiments include shelves and panels that have separate heating areas, the areas of which are different from each other to better accommodate different foods or food holding trays. Yet another alternate embodiment includes shelves and panels having separate heating areas that have different geometric shapes to match the shape of a food items or a food holding tray.

Those of ordinary skill in the art will appreciate that temperature control is important. The vulcanization layer 90 has a centrally-located hole 92, which is sized and arranged to receive a temperature sensor 93 in thermal contact with the glass-ceramic plate 100. Lead wires 94 extend from the sensor 93 to connect the temperature sensor 93 to electronic control devices for the power supplies that provide current to the heater wires 85 but are not shown in the figures.

Heating area 102 temperature control is preferably accomplished using a temperature sensor thermally-coupled to each heating area 102. Examples of sensor for use with the cabinet 10 are those disclosed in the Applicant's co-pending patent application Ser. No. 12/759,760 filed on Apr. 14, 2010, and entitled, "Temperature Sensor for a Food Holding Cabinet." The '760 application discloses among other things, a semiconductor temperature sensor and is incorporated by reference in its entirety.

Figure 5:
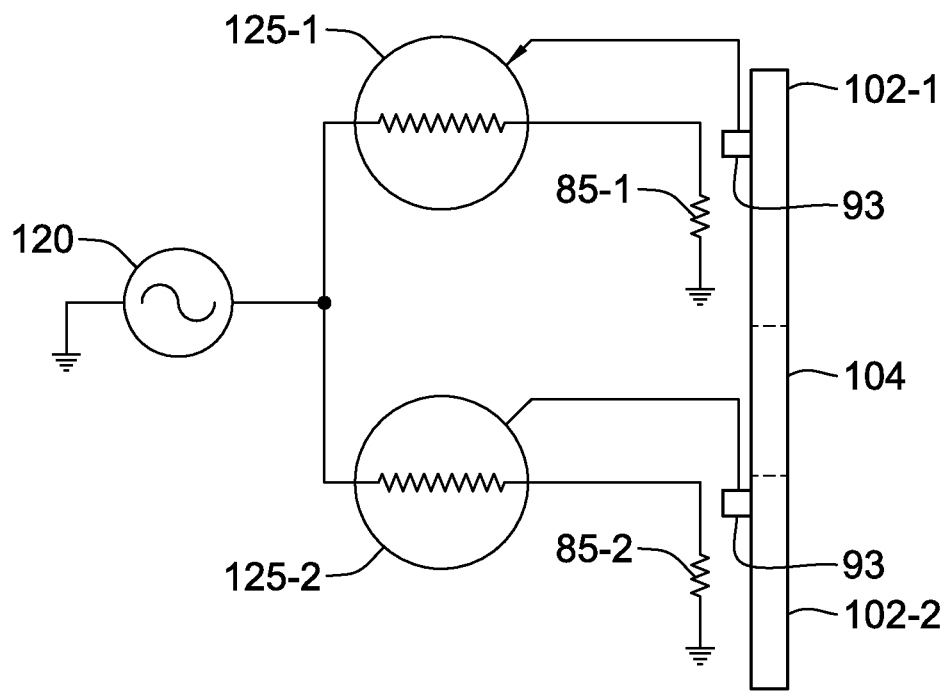
FIG. 5 is a combination schematic representation of the cabinet shown in FIG. 1.

FIG. 5 is a schematic diagram of the cabinet 10 shown in FIG. 1. An electric energy source 120 is coupled to the different heating elements 85-1 and 85-2 through corresponding power controllers 125-1 and 125-2. Semiconductor temperature sensors 93 as described in the aforementioned '760 application, are thermally coupled to regions of the glass-ceramic plate 100 where there is no heating wire 85.

The power controllers 125-1 and 125-2 are comprised of silicon-controlled rectifiers (SCR), TRIACs or relays, which are well-known to those of ordinary skill in the electronic arts. The controllers 125-1 receive signals from the semi-conductor temperature sensors 93, in response to temperatures of the corresponding heated regions 102. Not shown in the drawing, but well known to those of skill in the art, are microprocessors or microcomputers which receive signals from the temperature sensors 93 and control the power control devices 125 in a feedback loop.

It is important that the temperature sensors 93 be shielded from infrared energy emitted from the heating elements 85 in order to avoid having the sensors 93 heated by the IR rather than sensing the temperature of the glass-ceramic. The temperature sensors 93 disclosed in the aforementioned co-pending patent application are semiconductor devices on small circuit boards, which are in turn attached to the glass-ceramic panels using a double-sided, thermally-conductive tape. Circuit boards and thermally-conductive, tape that is used with the temperature sensors disclosed in the '760 application, are both considered herein to be IR shields for the temperature-sensing devices.

As shown in the co-pending application and as can be seen in FIG. 4B, the heating element 85 is a boustrophedonic or serpentine winding that provides space between each loop attached to the panel of glass-ceramic material. An alternate embodiment uses crenellate loops instead. Whether the pattern of heater wire 85 is boustrophedonic, crenellate or some other pattern, those of ordinary skill in the art will recognize that the temperature sensors 93 are applied to an area or region between heater wire loops.

The cabinet shown in FIG. 1 and FIG. 2 and the heating enabled by the use of a glass-ceramic plate facilitates a method for maintaining different food trays in different areas of the same compartment at different temperatures. That method is comprised of first providing thermal energy to a first area of a shelf that defines the compartment at a first rate or at a first energy density as measured in watts per unit area. Thermal energy is thereafter, or simultaneously provided to a second area of the same shelf at a different, second rate. In order for the two trays in the two areas to be kept at constant temperatures, it is necessary to sense or sample the temperatures of the two areas. Once those two temperatures are known, the thermal energy provided to the respective areas is easily accomplished by controlling the electric power provided thereto in a negative feedback loop.

Those of ordinary skill in the art will recognize that the foregoing is a description of an example. The true scope of the invention disclosed herein is set forth by the appurtenant claims.

What is claimed is:

1. A food holding cabinet comprising:
a chassis having a top, a bottom, first and second sides and front and rear panels, at least one of the front and rear panels having an opening through which a food product or food holding tray can be passed into the chassis;
a food holding compartment within the chassis;
a first glass-ceramic plate fixed in the chassis and having first and second opposing surfaces, the second surface of the first glass-ceramic plate facing into the compartment, the first surface facing away from the compartment;
a first heating element attached to a first area of the first surface of the first glass-ceramic plate;
a second heating element attached to a second area of the first surface of the first glass-ceramic plate, the second area being laterally separated from the first area, the first and second heating elements being electrically and spatially separated from each other, the first heating element configured to emit a first amount of infrared heat energy through the first area of the first glass-ceramic plate, the second element configured to emit a second amount of infrared heat energy through the second area of the first glass-ceramic plate.

2. The food holding cabinet of claim 1, wherein the first and second amounts of infrared heat energy are different from each other.

3. The food holding cabinet of claim 1, wherein the first and second areas are of different sizes.

4. The food holding cabinet of claim 1, wherein the first and second areas have first and second shapes that are different from each other.

5. The food holding cabinet of claim 1, wherein the second surface of the first plate faces into the compartment from one of:
a top of the compartment; and
a bottom of the compartment.

6. The food holding cabinet of claim 1 wherein the first and second areas are separated from each other by a third, unheated thermal break.

7. The food holding cabinet of claim 1, further comprised of at least one infrared reflector configured to reflect and direct toward the food holding compartment, infrared energy that is emitted by at least one of the first and second heating elements in a direction that is away from the food holding compartment.

8. The food holding cabinet of claim 1, further comprised of an ultraviolet filter, configured to block UV emitted from at least one of the first and second heating elements.

9. The food holding cabinet of claim 1 further comprising:
a first power controller coupled to the first heating element; and
a second power controller coupled to the second heating element;
wherein the first power controller is configured to provide a first amount of electric current to the first heating element and wherein the second power controller is configured to provide a second amount of electric current to the second heating element.

10. The food holding cabinet of claim 1 wherein at least one of the heating elements is a length of electrically-resistive material attached to the first surface of the shelf, the first heating element being configured as a plurality of rows, at least one of the rows being in a boustrophedonic pattern.

11. The food holding cabinet of claim 1 wherein at least one of the heating elements is a length of electrically-resistive material attached to the first surface of the shelf, the first heating element being configured as a plurality of rows, at least one of the rows being in a crenellate pattern.

12. The food holding cabinet of claim 10, further comprising a temperature sensor thermally coupled to at least one of the first area and the second area and electrically coupled to at least one of the first and second power controllers.

13. The food holding cabinet of claim 10, further comprising a temperature sensor thermally coupled to first plate, the temperature sensor being at least partially shielded from infrared energy emitted from said heating elements.

14. The food holding cabinet of claim 10, further comprising a first temperature sensor thermally coupled to the first area and a second temperature sensor thermally coupled to the second area, the first and second temperature sensors being at least partially shielded from infrared energy emitted from the first and second heating elements, electrical signals from the first and second temperature sensors determining the amount of electrical power provided to the first and second heating elements respectively.

15. The food holding cabinet of claim 13, wherein the first temperature sensor is attached to the first surface of the first plate.

16. A food holding cabinet comprising:
a chassis having a top, a bottom, first and second sides and front and rear panels, at least one of the front and rear panels having an opening through which a food product holding tray can be passed into the chassis;
first and second, glass-ceramic panels, each panel having first and second opposing surfaces, the first panel being fixed in the chassis between the top and bottom of the chassis, the second panel being fixed in the chassis below the first panel such that the second panel is between the second surface of the first panel and the bottom of the chassis, the first surface of the first panel facing the top of the chassis, the first surface of the second shelf facing the bottom of the chassis;

first and second electrically-resistive heating elements attached to corresponding first and second separate areas of the second surface of the first shelf, the first and second heating elements being electrically separated from each other, physically separated from each other on the second surface of the first shelf and heating the first and second separate areas;

third and fourth electrically-resistive heating elements attached to first and second separate areas of the second surface of the second shelf, the third and fourth heating elements being electrically separated from each other, physically separated from each other on the second surface of the second shelf and heating the third and fourth separate areas.

17. The food holding cabinet of claim 16, wherein first and second heated areas are configured to be heated to different temperatures.

18. The food holding cabinet of claim 16 wherein third and fourth heated areas are configured to be heated to different temperatures.

19. The food holding cabinet of claim 16, wherein first and second heated areas and the third and fourth heated areas are thermally separated from each other by unheated intermediate areas.

20. The food holding cabinet of claim 16 further comprising:

a power controller operatively coupled to a corresponding one of the electrically-resistive heating elements, the power controller configured to controllably provide electric current to a corresponding heating element in order to effectuate a desired temperature.

21. The food holding cabinet of claim 20, further comprising a temperature sensor thermally coupled to the power controller.

22. The food holding cabinet of claim 21, wherein the temperature sensor is comprised of a semiconductor temperature sensor.

* * * * *